Jan. 27, 1925. 1,524,638

E. O. HILLER

GLASS FEEDING MACHINE

Filed April 6, 1922

Inventor:
Everett O. Hiller
by
Atty.

Patented Jan. 27, 1925.

1,524,638

UNITED STATES PATENT OFFICE.

EVERETT O. HILLER, OF HARTFORD, CONNECTICUT, ASSIGNOR TO HARTFORD-FAIRMONT COMPANY, OF CANAJOHARIE, NEW YORK, A CORPORATION OF NEW YORK.

GLASS-FEEDING MACHINE.

Application filed April 6, 1922. Serial No. 550,071.

*To all whom it may concern:*

Be it known that I, EVERETT O. HILLER, a citizen of the United States, residing at Hartford, in the county of Hartford and State of Connecticut, have invented new and useful Improvements in Glass-Feeding Machines, of which the following is a specification.

This invention relates to glass feeding machines of the type in which two or more mechanical elements cooperate in time relation, one of which may be put out of and restored to its cooperation relation without effecting the continued operation of its associated element.

The object of the present invention is to provide means for returning such an inoperative element to operative condition in a predetermined timed relation to the co-operating element or elements. A further object is to provide means for returning the inoperative element to operation without shock or abnormal strain on any part of the mechanism.

The particular apparatus selected for illustrating this invention, is one in which the element which may be rendered inoperative, is a mechanism for separating or severing molten glass into mold charges, while the cooperating elements which continue in operation are the means for controlling the discharge of glass, and the shaping machine to which the mold charges are delivered. A machine of this character is shown in U. S. Patent No. 1,331,847 granted on the application of Homer A. Genest, and showing manually operated means for interrupting and resuming the operation of the glass severing means. In that patent the return of the parts to operative condition and relation at the proper time to avoid undesirable collisions or other consequences depends upon the skill of the operator, and is subject to some variation, particularly when the machine is running at high speed.

An embodiment of the invention as applied to the Genest machine referred to is illustrated in the accompanying drawings, in which:—

Figure 1:
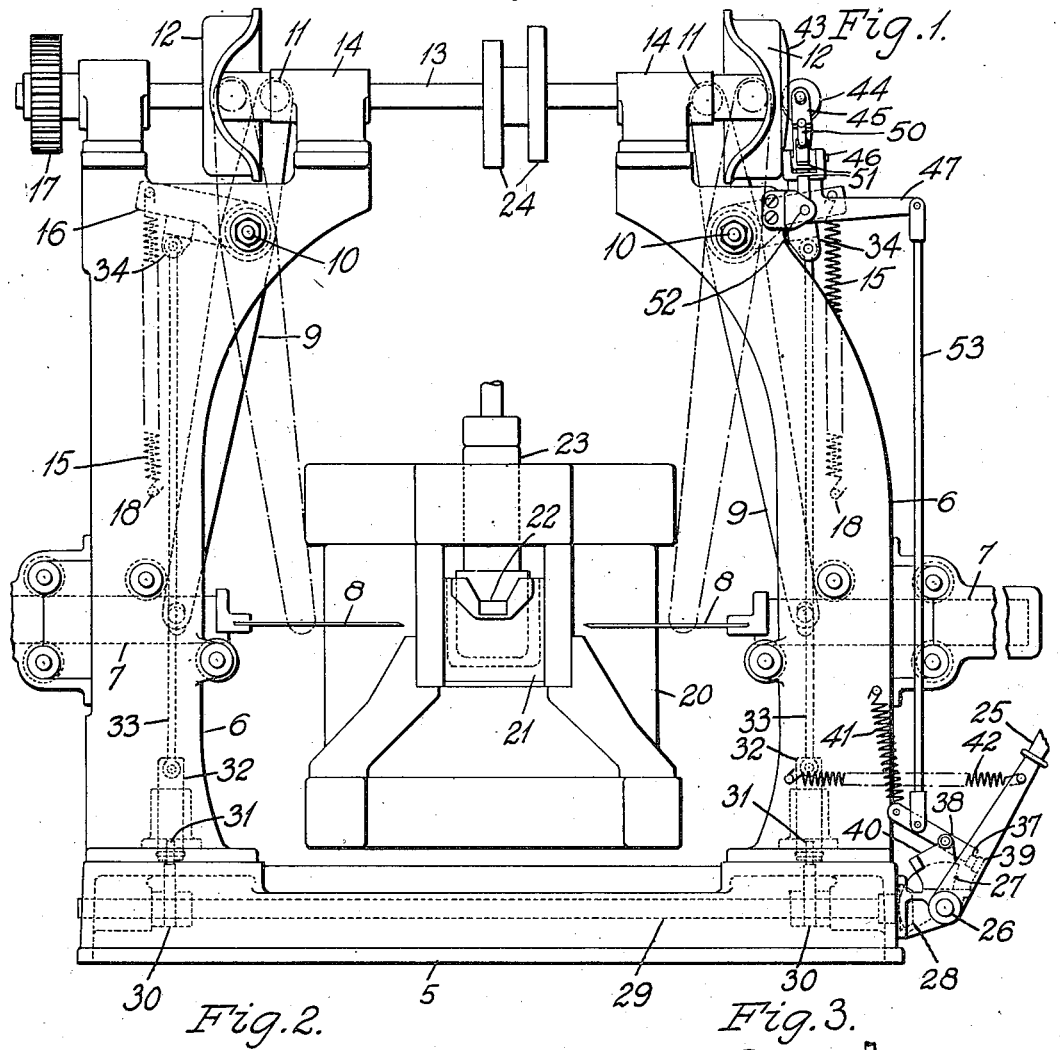
Figure 1 is a front elevation of a glass feeding machine, showing the forehearth of a glass furnace, and means for controlling the discharge of glass from the outlet.

The general construction of the illustrated embodiment of the invention is similar to that of the aforementioned patent in which a base 5 supports frames 6, in which are mounted a pair of shear slides 7, each of which carries a shear blade 8. The blades are reciprocated toward and from each other to sever the glass therebetween, by levers 9 pivoted on studs 10 fixed in the frames 6, and having rolls 11 engaging cams 12 mounted on a shaft 13 carried in suitable bearings 14 on the top of the frames 6. The blades are moved together and the rolls 11 are held against their respective cams by spring 15, connecting arms 16 rigidly connected with the shear levers 9, with fixed studs 18 on the frame. By this construction, when the shaft 13 is rotated by power applied to a gear 17, the cams 12 permit the springs 15 to act periodically to close the blades 8, after which the cams separate the blades and hold them retracted until the next severing operation.

The other element of the apparatus with which the severing means cooperate in timed relation, may be means for controlling the discharge of glass from a container, or a shaping machine to which the severed charges are delivered, or both. If means is provided for separating the glass into gobs or gathers, such means may comprise a plunger, gate or paddle operating periodically to retard the delivery of glass through an outlet, all of which devices are well known in the art. As the particular means employed for controlling the discharge forms no part of the present invention, that which is indicated in the Genest patent may be taken by way of example, and therefore is shown in Fig. 1. An extension or forehearth 20 connected with the usual furnace or tank carries a channeled block 21 having an outlet 22 from which the glass is discharged under the control of a paddle 23 actuated through suitable connections not shown, by cams 24 mounted on the shaft 13. Mold charges are periodically severed from the glass delivered from the outlet 22, by the shear blades 8.

When it is desired to permit the glass to be discharged from the outlet without severing mold charges therefrom, the shears are rendered inoperative by means of a handle 25. This handle is fixed on a shaft 26 carried in suitable bearings on the base 5 and having a segmental gear 27 in mesh with a gear 28 on a rock shaft 29 extending through the base 5. The rock shaft carries two cams 30 engaging rolls 31 carried by vertically movable slides 32. Each slide is connected by a rod 33 with an arm 34 loosely mounted on the shear lever stud 10, and having a part projecting below the arm 16. Thus when the handle 25 is turned into the position shown in Fig. 1, the cams 30 cause the arms 34 to be elevated so as to lift the arms 16 and thereby retract the shears and hold them out of control of the cams 12. The rolls 11 are preferably moved altogether out of contact with their cams.

When the handle 25 is moved into the position of Fig. 1, a lug 37 on the handle moves under a latch 38 and against a stop 39 formed on a bracket 40. The latch is pivotally mounted on the bracket and held in position to engage the lug 37 on the handle, by a spring 41, thereby holding the handle against the action of a spring 42 which urges the handle to the left, into its position which permits operation of the shears.

Figure 2:
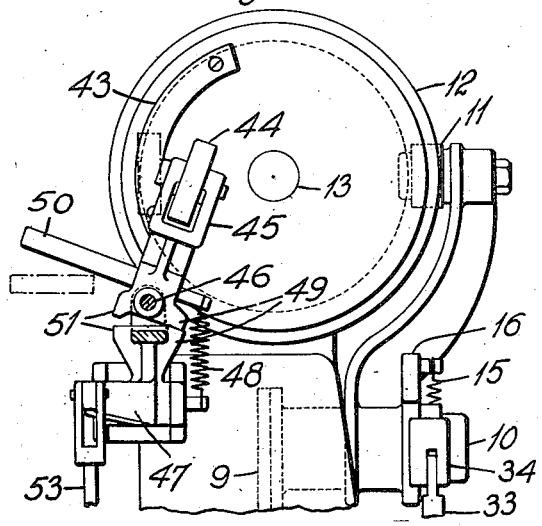
Fig. 2 is an elevation, on an enlarged scale, of the upper part of Fig. 1, looking from the right.
Figure 3:
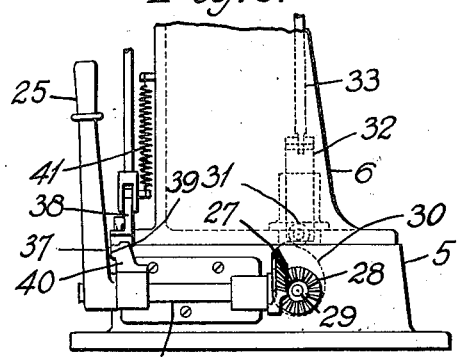
Fig. 3 is an elevation of the lower part of Fig. 1, also looking from the right.

The illustrated embodiment of the invention provides means which, after being rendered operative by the operator, automatically returns the shears to operative condition in timed relation to the operation of the paddle or other means for controlling the discharge of glass from the outlet and of the shaping machine to which the glass may be delivered. For this purpose, the latch 38 is arranged to be released by a mechanism actuated by the shaft which actuates the paddle 23 and which also operates in timed relation to the shaping machine. The latch is released by a cam 43, fixed on one of the shear cams 12, which acts on a roll 44 when the latter is moved into the pathway of the cam. For this purpose the roll is mounted in a yoke 45 pivoted on a pin 46 carried by the short vertical arm of a bell crank 47. The yoke is yieldingly held toward the shaft 13 (see Fig. 2), with the roll 44 inside the path of the cam 43, by a spring 48, lugs 49 being provided to limit this movement. A handle 50 is provided by which the roll may be swung into the path of the cam 43, similar stop lugs 51 determining this position.

The bell crank 47 is mounted on a fixed pivot 52 and the long arm is connected by a rod 53, with the latch 38, the arrangement being such that the cam 43, when it engages the roll 44, will lift the right hand end of the latch (Fig. 1) thus releasing the lug 37 and allowing the handle 25 to swing to the left under the action of the spring 42. This lowers the arms 34 through the mechanism described, and puts the shear levers 9 again under the control of the shear cams 12.

The operation of this invention will best be understood by following the steps which take place in returning the feeder to normal running condition from the position shown in Fig. 1, in which the shear blades 8 are held retracted in inoperative position by the latch 38. The normal discharge of glass from the outlet 22, whether it be a continuous stream or separate gathers, has not been interrupted by the inaction of the shears, as the paddle 23, or other discharge controlling means, continues its movements. When the operator wishes to start severing mold charges, he moves the handle 50 down, thereby placing the roll 44 in the path of the cam 43, as shown in broken lines in Fig. 2, and holds it there until the cam 43 revolves into position to engage the roll. The bell crank 47 will thus be rocked and the handle 25 released from the latch 38 as has been described. The angular position of the cam 43 determines the time when the shears shall become operative and the cam always maintains its timed relation with the other elements of the apparatus. The cam may be so positioned that the shears or other inoperative element, will be rendered operative at any desired point in the cycle of the other elements. Thus the shears are preferably thrown into control of their cams during the interim between severing operations, that is, when the high part of the cams 12 are opposite their rolls 11. This prevents an out-of-time severing operation which would occur if the latch 38 were released at a time when the springs 15 could act at once to move the shear blades together without the controlling intervention of the cams 12 and also avoids the strain on the parts which would be caused by the collision of the roll 11 with the lower parts of the cams 12, should the shears be released while the rolls were opposite the low parts of the cams.

After the shears have resumed operation, the operator releases the handle 50 and the roll 44 is at once returned to inoperative position (Fig. 2) by the spring 48. The severing operation continues until the shears are again thrown out by actuation of the handle 25.

It is to be understood that the particular embodiment of the invention which has been described, is selected for the purpose of illustration only and that the invention is not limited to use with severing means or the other elements described and it is capable of various modifications without departing from the scope of the appended claims.

I claim:

1. A glass feeding machine comprising a plurality of elements cooperating to deliver mold charges of molten glass, having in combination means for independently rendering one of the elements inoperative, and automatic means for returning the element to operative condition at a predetermined time with relation to the operation of the other element or elements.

2. A glass feeding machine comprising a plurality of elements cooperating to deliver mold charges of molten glass, having in combination means for independently rendering one of the elements inoperative, a cam rotating in timed relation to the operating element, and connections between the cam and the inoperative element to control its return to operative condition.

3. A glass feeding machine comprising a plurality of elements cooperating to deliver mold charges of molten glass, having in combination means for independently rendering one of the elements inoperative, normally inoperative automatic means for returning the inoperative element to operative condition, and manually operated means for rendering said automatic means operative.

4. A glass feeding machine comprising means for severing the glass, means for rendering the severing means inoperative, and automatic means for controlling the return of the severing means to operative condition.

5. A glass feeding machine comprising means for severing the glass, means for rendering the severing means inoperative, and means rendered operative by the operator, for automatically returning the severing means to operative condition at a predetermined time in the cycle of the machine.

6. The combination with a machine for feeding molten glass, of severing means operating in timed relation to the operation of the feeding machine, manually operated means for rendering the severing means inoperative, normally inoperative automatic means for returning the shears to operative condition, and manual means for rendering said automatic means operative.

7. A glass feeding machine comprising glass severing means, a latch adapted to hold the severing means inoperative, and automatic means for releasing the latch to render the severing means operative at a predetermined time in the cycle of the machine.

8. Glass severing mechanism comprising shears, power actuating mechanism therefor, means for disconnecting the shears from the actuating mechanism, and means for determining the time relative to the actuating mechanism, when the shears shall be reconnected to said mechanism.

9. Glass severing mechanism comprising a shear blade, a spring to move the blade toward the glass, a cam to move the blade away from the glass, a latch to hold the blade away from the glass, and a power actuated cam to actuate the latch to release the blade.

10. Glass severing mechanism comprising a shear blade, means for reciprocating the blade toward and from the glass, a latch to hold the blade retracted from the glass, a constantly rotating cam, and means for connecting the cam with the latch to release the blade.

Signed at Hartford, Connecticut, this 5th day of April, 1922.

EVERETT O. HILLER.